(12) United States Patent
Grove-Nielsen

(10) Patent No.: US 10,279,549 B2
(45) Date of Patent: *May 7, 2019

(54) RESIN FLOW MEMBER FOR A VACUUM ASSISTED RESIN TRANSFER MOULDING PROCESS

(71) Applicant: SIEMENS AKTIENGESELLSCHAFT, München (DE)

(72) Inventor: Erik Grove-Nielsen, Roslev (DK)

(73) Assignee: SIEMENS GAMESA RENEWABLE ENERY A/S, Brande (DK)

( * ) Notice: Subject to any disclaimer, the term of this patent is extended or adjusted under 35 U.S.C. 154(b) by 141 days.

This patent is subject to a terminal disclaimer.

(21) Appl. No.: 15/291,592

(22) Filed: Oct. 12, 2016

(65) Prior Publication Data

US 2017/0028654 A1 Feb. 2, 2017

Related U.S. Application Data

(62) Division of application No. 13/855,816, filed on Apr. 3, 2013, now Pat. No. 9,492,992.

(30) Foreign Application Priority Data

Apr. 4, 2012 (EP) ..................................... 12163176

(51) Int. Cl.
*B29C 70/44* (2006.01)
*B29C 70/54* (2006.01)
(Continued)

(52) U.S. Cl.
CPC .......... *B29C 70/547* (2013.01); *B29C 70/443* (2013.01); *B29C 70/48* (2013.01);
(Continued)

(58) Field of Classification Search
CPC ........ B29C 70/443; B29C 70/547; B32B 5/26
See application file for complete search history.

(56) References Cited

U.S. PATENT DOCUMENTS

| 6,586,054 B2 * | 7/2003 | Walsh | B29C 70/443 |
| | | | 264/101 |
| 7,060,156 B2 * | 6/2006 | MacK | B29C 70/24 |
| | | | 156/161 |

(Continued)

FOREIGN PATENT DOCUMENTS

| WO | WO-2007038930 A1 * | 4/2007 | ........... B29C 70/342 |
| WO | WO-2012026980 A2 * | 3/2012 | ........... B29C 70/443 |

*Primary Examiner* — Robert B Davis

(57) ABSTRACT

The disclosure relates to a fibre reinforced plastic composite material, including a vacuum assisted resin transfer moulded fibre reinforced plastic laminate prepared by use of a resin flow enhancing member, including a cavity with a first opening and a second opening as well as an resin flow adjusting arrangement for changing a resin flow cross section in a resin flow direction from the first opening to the second opening in the resin flow enhancing member by applying vacuum to the second opening. The resin flow adjusting arrangement includes a plurality of vacuum expandable filler elements that includes gas-filled closed cell cavities and flexible walls. The disclosure further relates to a vacuum assisted resin transfer moulding process for injecting resin from a resin flow enhancing member into a fibre stack.

9 Claims, 4 Drawing Sheets

(51) Int. Cl.
*B32B 5/26* (2006.01)
*B29C 70/48* (2006.01)
*B32B 37/10* (2006.01)
*B32B 5/02* (2006.01)
*B29K 105/06* (2006.01)
*B29K 421/00* (2006.01)
*B29L 31/08* (2006.01)

(52) U.S. Cl.
CPC .................. *B32B 5/02* (2013.01); *B32B 5/26* (2013.01); *B32B 37/1009* (2013.01); *B29K 2105/06* (2013.01); *B29K 2421/00* (2013.01); *B29L 2031/085* (2013.01); *B32B 2260/023* (2013.01); *B32B 2260/046* (2013.01); *B32B 2262/101* (2013.01); *B32B 2262/106* (2013.01); *B32B 2305/30* (2013.01); *B32B 2603/00* (2013.01); *Y10T 428/1352* (2015.01)

(56) References Cited

U.S. PATENT DOCUMENTS

| | | | | |
|---|---|---|---|---|
| 9,492,992 | B2* | 11/2016 | Grove-Nielsen | ... B32B 37/1009 |
| 2008/0277053 | A1* | 11/2008 | Stiesdal | ................ B29C 70/342 |
| | | | | 156/245 |
| 2011/0169190 | A1* | 7/2011 | Miller | ................... B29C 70/443 |
| | | | | 264/257 |

* cited by examiner

RESIN FLOW MEMBER FOR A VACUUM ASSISTED RESIN TRANSFER MOULDING PROCESS

CROSS REFERENCE TO RELATED APPLICATIONS

This application is the US Divisional application of U.S. application Ser. No. 13/855,816, filed Apr. 3, 2013 and claims the benefit thereof. The U.S. application Ser. No. 13/855,816 claims the priority of European Patent Office application No. 12163176 EP filed Apr. 4, 2012. All of the applications are incorporated by reference herein in their entirety.

FIELD OF INVENTION

The disclosure relates to a resin flow enhancing member for a vacuum assisted resin transfer moulding process (VARTM), comprising a cavity with a first opening as a resin inlet and a second opening connectable to a vacuum pump. The disclosure further relates to a fibre reinforced plastic laminate comprising a fibre stack and at least one resin flow enhancing member as well as to a fibre reinforced plastic composite material prepared by using a resin flow enhancing member. Moreover, the disclosure relates to a vacuum assisted resin transfer moulding process for injecting resin from a resin flow enhancing member into a fibre stack. The fibre reinforced composite material and the vacuum assisted resin transfer process is in particularly suitable for the manufacturing of a variety of technical products such as car parts, aeroplane parts, storage tanks, wind turbine blades, etc.

BACKGROUND OF INVENTION

Wind turbine blades for rotors of wind turbines currently have a length of about 40 meters or more, sometimes about 90 or 100 meters. The wind turbine blades need to be very stiff and, thus, usually constitute a shell structure comprising a metal or composite material. Parts of cars or aeroplanes need to fulfil similar physical requirements concerning the composite materials. Such composite materials commonly consist of a plastic material that is reinforced with fibres such as glass fibres, carbon fibres or others. A growing number of such products are manufactured by vacuum assisted resin transfer moulding processes.

In the VARTM a stack of fibres or a fibre stack is placed in a mould. The mould is closed by a second mould part or a plastic liner is placed over the mould. Vacuum is applied to the fibre filled hollow mould structure by a vacuum pump connected to one opening of the mould. A resin is then infused from a resin container, optionally a resin mixing facility, into the fibre stack. The provided resin fills out the space between the fibres and is finally cured in the mould. In this way a rigid reinforced composite structure having a specific shape is manufactured. The resin flows into the mould cavity through inlet holes distributed over the mould surface. In conventional VARTM processes resin flow channels in the mould inner surfaces or in the core material surfaces are used to permit for a faster flow of resin to certain areas of the mould system. The use of extra resin channels in the mould surfaces and in the core material surfaces enhances the penetration of resin from both sides of a laminate into the fibre stack, to get a fast wetting of the total fibre stack. However, the extra resin channels take up extra amounts of resin, which make the composite parts manufactured heavier and more expensive.

Alternatively, it is known in the prior art to place a special resin flow enhancing member, also called flow sheet (e.g. a fibre filled tube or sheet member), between the plastic liner (e.g. a vacuum film or vacuum foil) and the fibre stack to be wetted by the resin. When the resin is sucked into the mould cavity it flows fast through the resin flow enhancing member, whereas the fibre material is denser and exhibits a higher resistance to the resin flow. Partly forced by vacuum and partly by capillary forces, the resin is distributed into the fibre material. As the resin flows over an area, the foremost area of the resin in movement is called the resin flow front.

During a VARTM process the highest vacuum is found in the air filled space in front of the resin flow front. The static vacuum declines behind the resin flow front. Due to the differences in static pressures, the resin flows fast through the resin flow enhancing member, mainly passing over the fibre material to be wetted. Thus, a correct wetting of all fibres inside the mould cannot be guaranteed, especially in fibre stacks having a substantial thickness and/or length.

SUMMARY OF INVENTION

Therefore, an improved resin flow enhancing member, a fibre reinforced plastic laminate, a fibre reinforced plastic composite material, and an improved vacuum assisted resin transfer moulding process for injecting resin from a resin flow enhancing member into a fibre stack is provided.

A resin flow enhancing member, a fibre reinforced plastic laminate, a fibre reinforced plastic composite material, and an improved vacuum assisted resin transfer moulding process for injecting resin from a resin flow enhancing member into a fibre stack are provided.

The resin flow enhancing member is adapted for the use in a vacuum assisted resin transfer moulding process. The resin flow enhancing member comprises a cavity with a first opening connectable to a resin inlet of a VARTM apparatus and a second opening connectable to a vacuum pump of a VARTM apparatus. The cavity of the member functions as resin flow path through the member. Both openings can be arranged at opposite ends of the cavity to allow a straight flow of the resin from the resin inlet opening, the first opening, to the second opening. The resin flow enhancing member generally has the function of enabling or enhancing the transport of the resin from the resin inlet to the second opening by means of providing the cavity for resin flow and allowing penetration of the resin in perpendicular direction into the fibre stack arranged adjacent to the member.

The resin flow enhancing member can have a substantially tube-like or sheet-like structure with a first upper surface made of a vacuum film or vacuum foil and a second lower surface having, e.g. openings for resin flow perpendicular to the resin flow direction in the member into the fibre stack or being of a material through which resin can penetrate into the fibre stack positioned thereunder. Alternatively, two opposite surfaces of the resin flow enhancing member can be adapted for enabling resin intrusion into adjoining fibre stacks at either surfaces. This alternative can be used if the resin flow enhancing member is used within the fibre stack, which means as an intermediate layer which remains inside the fibre stack.

In this tube-like or sheet-like member, the resin is transported from the first opening over the surface of the fibre stack to the second opening by means of the difference in static pressure, i.e. vacuum at the second opening and about atmospheric pressure or higher at the first opening. Generally, any pressure difference between both ends facilitates the resin flow in the member. Thus, the term vacuum means that the static pressure at this side is lower than the static pressure at the other side. Alternatively, if both pressures are higher than atmospheric pressure, the term "vacuum" means reduced pressure relative to the resin inlet side of the member. Behind the resin flow front the resin is infiltrated into the fibre stack through openings in an angular direction to the resin flow in the resin flow enhancing member. For example, the infiltration can take place in a substantially perpendicular direction to the resin flow direction.

In the light of the above, the resin flow enhancing member has a supporting structure for enabling and improving the transport of the resin from one end of the resin flow enhancing member to the opposite end thereof.

The resin flow enhancing member additionally comprises a resin flow adjusting arrangement for changing a resin flow cross section, i.e. the cross sectional area, in a resin flow direction from the first opening to the second opening in the resin flow enhancing member by applying vacuum to the second opening. The resin flow adjusting arrangement thus enables a slower movement of the resin flow front in contrast to the conventional resin flow enhancing members without such a resin flow adjusting arrangement. At the same time, the resin flow of the resin perpendicular to the surface of the member is increased. Thus, the resin intrusion from the resin flow enhancing member into the fibre stack adjoining the surface is promoted by the specific structure of the resin flow adjusting arrangement. This can improve the wetting process of the fibre stack, even if the fibre stack has a significant thickness.

The advantageous effect of the resin flow adjusting arrangement is that the dynamic resistance to the resin flow can now be regulated by the vacuum. That means that the amount of resin intrusion can be simultaneously regulated because if the dynamic resistance of the resin flow front will be lowered, the resin intrusion into the fibre stack will be increased at the same time.

The above object is in a further aspect is met by a fibre reinforced plastic laminate comprising a fibre stack and at least one resin flow enhancing member on at least one of the surfaces of the fibre stack. The term, "fibre reinforced laminate" means a laminate comprising a number of (that means at least one, but can also be a plurality, i.e. two or more) fibre layers and at least one resin flow enhancing member placed on at least one surface of this fibre layer. A fibre layer can be made of one or more fibre plies. One or more such fibre layers can be arranged in one fibre stack for the use in the fibre reinforced laminate.

The fibre reinforced laminate may be a laminate treated by resin infiltration and cured. The use of the resin flow enhancing member in the laminate allows a regulation of the resin flow perpendicular to the resin flow direction within the resin flow enhancing member. Thus, the intrusion of the resin into the fibre stack can be improved, especially made more reliable and faster than in conventional VARTM processes.

In a further aspect, the use of the resin flow enhancing member enables the manufacturing of a fibre reinforced plastic composite material having improved properties such as a lower weight and an improved reliability. The reinforced plastic composite material comprises a vacuum assisted resin transfer moulded fibre reinforced plastic laminate prepared by using a resin flow enhancing member.

In a further aspect, the afore-mentioned general object is met by a vacuum assisted resin transfer moulding process for injecting resin from a resin flow enhancing member into a fibre stack. In this process, the resin flow member comprises a cavity with a first opening connectable to a resin inlet of a VARTM apparatus and a second opening connectable to a vacuum pump of a VARTM apparatus, a resin penetrable wall or openings for penetration of resin into the fibre stack, and a resin flow adjusting arrangement. The process comprises among others a step of changing a resin flow cross section or cross sectional area of the resin flow enhancing member in a resin flow direction by applying vacuum at the second opening. By changing the resin flow cross section of the resin flow enhancing member by applying vacuum at the second opening, the dynamic resistance of the resin flow in the resin flow enhancing member can be regulated. In the process, the air filled area in front of the resin flow front is at a low static pressure level (vacuum) providing a high dynamic resistance to the resin flow. In contrast thereto, in the area behind the flow front, the static pressure is higher and the dynamic resistance to the resin flow is reduced. Thus, the flow through the resin flow enhancing member and the dispersion or intrusion into the fibre stack in the area below the member is enhanced.

Particularly advantageous embodiments and features are given by the dependent claims, as revealed in the following description. Further embodiments may be derived by combining the features of the various embodiments described in the following, and features of the various claim categories can be combined in any appropriate manner.

The resin flow enhancing member according to a preferred embodiment has a resin flow adjusting arrangement, i.e. a sheet-like element or a sheet structure, comprising a number of tubes, preferably arranged in one layer, having a vacuum compressible outer wall structure and being in particular longitudinally directed in the resin flow direction. A compressible outer wall structure means that the wall of each tube is made of a flexible material or has a flexible structure allowing a change of the cross sectional area of each tube by changing the general structure or shape of the tube (e.g. of the diameter of the tube itself). If a low static pressure is applied to the tube, i.e. in the state of applying vacuum to the tube (in front of the resin flow front), the outer shape of the tube will be changed to a smaller diameter of the tube. If the static pressure is increased (e.g. behind the resin flow front), the diameter of the tube is increased and the resin flow inside the tube is promoted by the larger diameter. Simultaneously, the resin flow perpendicular to the movement of the resin flow front, i.e. the resin flow into the fibre stack, is increased with the larger diameter and the increased resin flow in the resin flow enhancing member.

When the resin flow into the fibre stack is increased, the speed of the movement of the resin flow front is reduced. Thus, the intrusion of the resin into the fibre stack can be improved by the specific resin flow adjusting arrangement as comprised in the resin flow enhancing member.

In an alternative embodiment or as a further technical improvement of the afore-mentioned embodiment, the resin flow enhancing member has preferably a resin flow adjusting arrangement comprising a number of vacuum expandable filler elements. Filler elements are separate elements provided within the inner cavity of the tube and filling a part of the tube cross sectional area. Thus, the cross sectional area can be specifically adjusted by the amount and the shape of the fillers. A higher amount and a bigger outer shape of the fillers will result in a lowering of the cross sectional area which is free for the resin flow through the resin flow enhancing member.

Preferred examples of such vacuum expandable filler elements comprise closed cell particles and/or hollow fibres and/or hollow spheres. More particularly, the elements are made vacuum expandable by having closed cell cavities which are preferably filled with gases (e.g. air). When the static pressure is decreased outside the elements, they will be expanded because of the gas pressure applied from their inside. That means that the vacuum expandable elements swell up at low pressure (vacuum) and, thus, reduce the free space between the elements in the resin flow enhancing member. The cross sectional area for the resin flow is decreased at the same time. Therefore, the resin intrusion into the fibre stack is increased and the speed of the movement of the resin flow front is decreased due to the swollen elements in front of the resin flow front.

Embodiments of such vacuum expandable elements are gas-filled micro balloons having flexible walls or being made of flexible wall materials, gas-filled hollow fibres, or gas-filled porous or closed cell fibres or particles having flexible walls. Exemplified flexible materials for the elements are elastomeric plastic materials, e.g. phenolic plastic spheres, or thermoplastic elastomers (TPE), e.g. TPE fibres made from SPANDEX (also known as Elastane or LYCRA) which is a polyurethane polurea copolymer, developed by DuPont. The thermoplastic elastomers can also be mixed with other thermoplastic fibres such as thermoplastic polyesters, etc.

The fibre reinforced plastic laminate according to the second aspect is preferably developed such that the laminate comprises a plurality of resin flow enhancing members arranged in the fibre stack. The members can be provided either at the outer surfaces of the laminate and/or within the fibre stack, that means in between two or more fibre layers to enhance the resin flow at several portions of the fibre stack. If more resin flow enhancing elements are provided, the resin infusion is faster, even in thick fibre stacks.

In a further embodiment, the fibre reinforced plastic laminate comprises a resin flow enhancing member having a number of resin openings for resin penetration into the fibre stack. The openings are preferred in such an area of the tube wall which is directly or indirectly adjacent to a fibre stack during operation. The other tube walls are preferably covered by a non-penetrable film such as a vacuum film for maintaining the static pressure inside the member.

Alternatively or in addition to the above embodiment, the fibre reinforced plastic laminate may comprise a resin flow enhancing member having a resin penetrable wall for resin penetration into the fibre stack. Such a penetrable wall can be made of a porous material suitable for being penetrated by the resin during the use in a VARTM process.

In another embodiment of the fibre reinforced plastic laminate according to the second aspect, the laminate comprises a peel ply or peel layer between the fibre stack and the resin flow enhancing member in order to peel up the resin flow enhancing member after the VARTM process has been finished. This allows the use of this member only for the production of the fibre reinforced composite material. This would improve the weight of the fibre reinforced composite materials. Alternatively, the resin flow enhancing member could be mechanically abraded or grinded after the curing step.

The fibre reinforced plastic laminate according to another preferred embodiment comprises a vacuum film provided on the resin flow enhancing member. The vacuum film is generally used in vacuum assisted resin infusion processes where a flexible vacuum bag is used as an upper mould. This vacuum film generally is peeled off, optionally together with the peel ply and the resin flow enhancing member, after the resin has been cured.

The fibre reinforced plastic composite material according to the third aspect can preferably be developed such that the composite material has a shape of a wind turbine blade. The use of the resin flow enhancing member is preferred for the manufacturing of wind turbine blades using the VARTM process because the composite material has an improved reliability and a higher quality as a better wetting can be achieved during the manufacturing process. In addition, the use of the faster and more efficient resin intrusion process, allows the use of less resin. Thus the manufacturing costs are reduced and the material can be made more lightweight.

In the vacuum assisted resin transfer moulding process according to a preferred embodiment of the fourth aspect, the resin flow front moves from a resin intrusion side to a vacuum side of the resin flow enhancing member during the process. In addition, the cross section or the cross sectional area is changed at the resin flow front in order to make the migration or intrusion of the resin into the fibre stack (angular, e.g. perpendicular, to the mould surface and the direction of the resin flow enhancing member) faster and more efficient. Moreover, less resin is used because of the improved efficiency of the process. Costs and time for the manufacturing of plastic composite materials can be reduced.

BRIEF DESCRIPTION OF THE DRAWINGS

Other objects and features will become apparent from the following detailed description considered in conjunction with the accompanying drawings. It is to be understood, however, that the drawings are designed solely for the purposes of illustration and not as a definition of the limits of the invention.

DETAILED DESCRIPTION OF INVENTION

Figure 1:
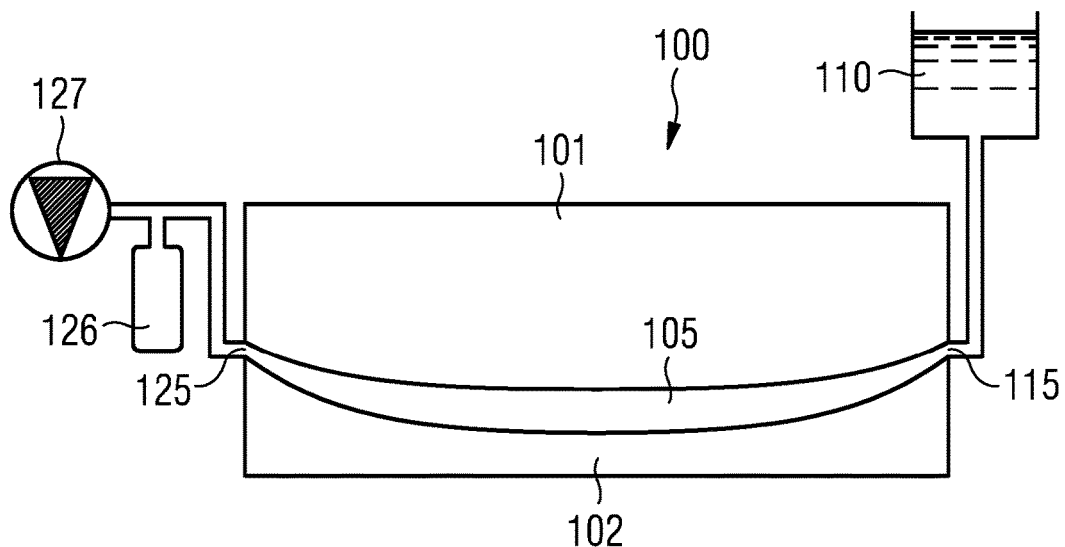
FIG. 1 shows a schematic cross-sectional view of a VARTM apparatus according to the prior art.

In the drawings, like reference numbers refer to like objects throughout. Objects in the diagrams are not necessarily drawn to scale.

FIG. 1 shows a schematic view of a conventional vacuum assisted resin transfer moulding (VARTM) apparatus which can be used for applying the process. The apparatus comprises a mould 100 with a cavity 105 essentially in the form of the plastic composite part to be produced. The apparatus further comprises a resin container 110 connected to the cavity 105 via a resin inlet opening 115. At the opposite end of the cavity 105, the apparatus comprises a resin outlet 125 connected to a resin trap 126 and a vacuum pump 127.

A fibre stack composed of a plurality of fibre reinforced fabric layers is positioned in the cavity 105 of the mould 100 composed of a first mould part 101 and a second mould part 102. The mould 100 is closed and the resin is injected into the mould 101 to wet the fabric layers (not shown) positioned in the cavity 105. The wetting process is started from the side of the resin inlet 115 and protrudes to the side of the resin outlet 125. The driving force for the migration of the resin is the low static pressure (vacuum) produced by the vacuum pump 127. After the resin process has been finished, the produced fibre reinforced plastic composite is cured. Suitable curing temperatures are from room temperature up to about 200° C., depending on the application/resin system. Therefore a heating element (not shown) can preferably be integrated in or around the mould 100. Alternatively, the mould can be placed into an autoclave for at least the curing step.

The above VARTM apparatus can be varied such that the mould 100 is made from a support plate and a flexible vacuum film as second mould part positioned on the fibre stack arranged on the support plate. Optionally, a resin flow enhancing member can be placed between the fibre stack and the vacuum film.

Figure 2:
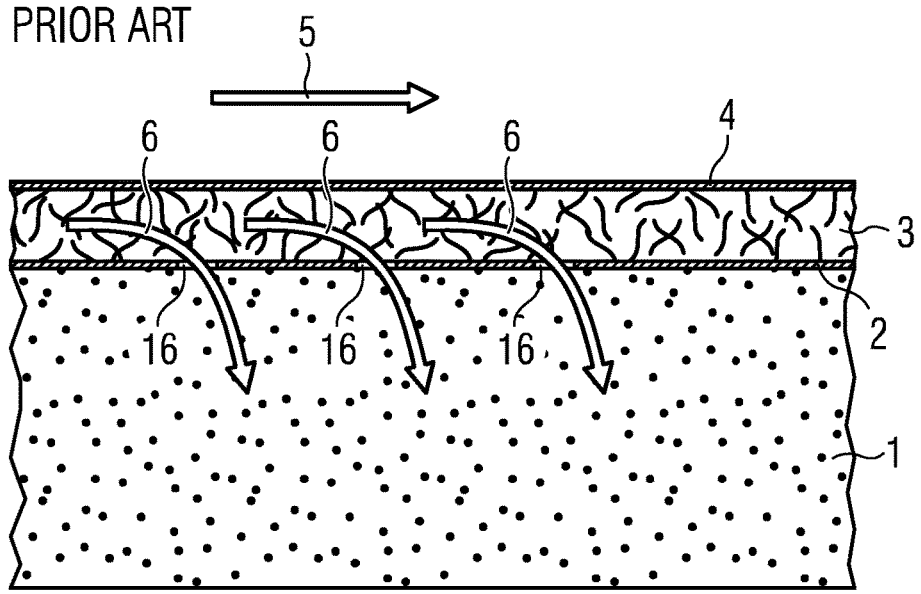
FIG. 2 shows a cross section of a laminate part in a VARTM process according to the state of the art.

FIG. 2 shows a cross section of a laminate part in a VARTM process using a resin flow enhancing member according to the state of the art. The laminate part is positioned on a support plate (not shown), whereupon a fibre stack 1 is directly or indirectly placed. As the next layer of the laminate, a peel ply 2 made of a resin penetrable material is positioned on the fibre stack, followed by a resin flow enhancing member 3 composed of a non-woven thermoplastic textile. As the uppermost layer, the laminate comprises a vacuum plastic film 4 as an upper mould part.

The resin inlet opening (not shown) is at the right hand side and the vacuum pump (not shown) is placed at the left hand side of the laminate. Thus, the flow direction 5 of the resin is from the left hand side to the right hand side in this figure. During the migration of the resin 6 in the resin flow enhancing member 3, the resin 6 is infiltrated or distributed into the fibre material by static pressure (vacuum) inside the fibre stack 1 and by capillary forces. The infiltration of the resin 6 into the fibre stack 1 is angular, preferably substantially perpendicular, to the flow direction 5. The infiltration flow is indicated by the arrows 6 in the figure.

Figure 3:
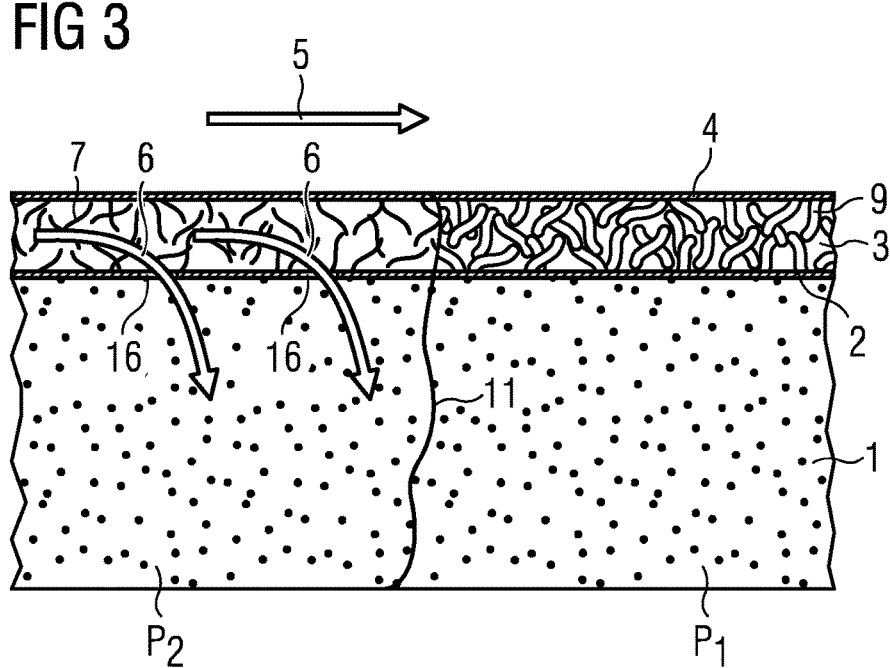
FIGS. 3 and 3a show a cross section of a laminate part in a VARTM process according to a first embodiment.

FIG. 3 shows a cross section of a laminate part in a VARTM process according to a first embodiment. The laminate has the same constitution as the laminate shown in FIG. 2 except that a resin flow enhancing member 3 is used. Thus, for the general constitution, it is referred to the description of FIG. 2.

The resin flow enhancing member 3 is composed of gas-filled hollow fibres 7, 9. The fibre material is made of a flexible thermoplastic elastomeric material. Thus, the fibres 7, 9 have the function of a vacuum expandable resin flow adjusting element.

When the resin flows over the fibre stack area in the resin flow enhancing member 3, the static pressure within the resin flow enhancing member 3 varies at the resin flow front 11. Varies means in this regard that the static pressure gradually changes from a low to a high pressure within a certain length at the flow front instead of suddenly changing at a certain front. The static pressure ($P_1$) is low in front of the resin flow front and high (P2) behind the resin flow front, that means at the side filled with resin. The hollow fibres 7 in front of the resin flow front 11 swell due to the low static pressure ($P_1$=20 mbar) to a volume of about 50 mm$^3$ at the other side of the resin flow front during the VARTM process. The volume of the hollow fibres 9 declines to about 1 mm$^3$ behind the resin flow front because of the higher static pressure ($P_1$=1013 mbar) inside the resin flow enhancing member 3.

Consequently the free cross sectional area for the resin flow or the free space between the fibres 7, 9 in the resin flow enhancing member 3 is lower before the resin flow front 11 and, thus, the speed of the flow front 11 itself is reduced by the swollen fibre material 9. Therefore, the resin flow enhancing member 3 advantageously provides a slower movement of the resin flow front 11 and, thus, enables a higher resin flow 6 perpendicular to the surface from the resin flow enhancing member 3 into the fibre stack 1. This allows for a faster and more efficient resin migration into the fibre stack 1, a higher quality of the fibre reinforced parts due to a better wetting, and a reduction of the amount of resin material for reducing the overall costs of the VARTM process as well as lowering the weight of the parts produced.

Figure 3A:
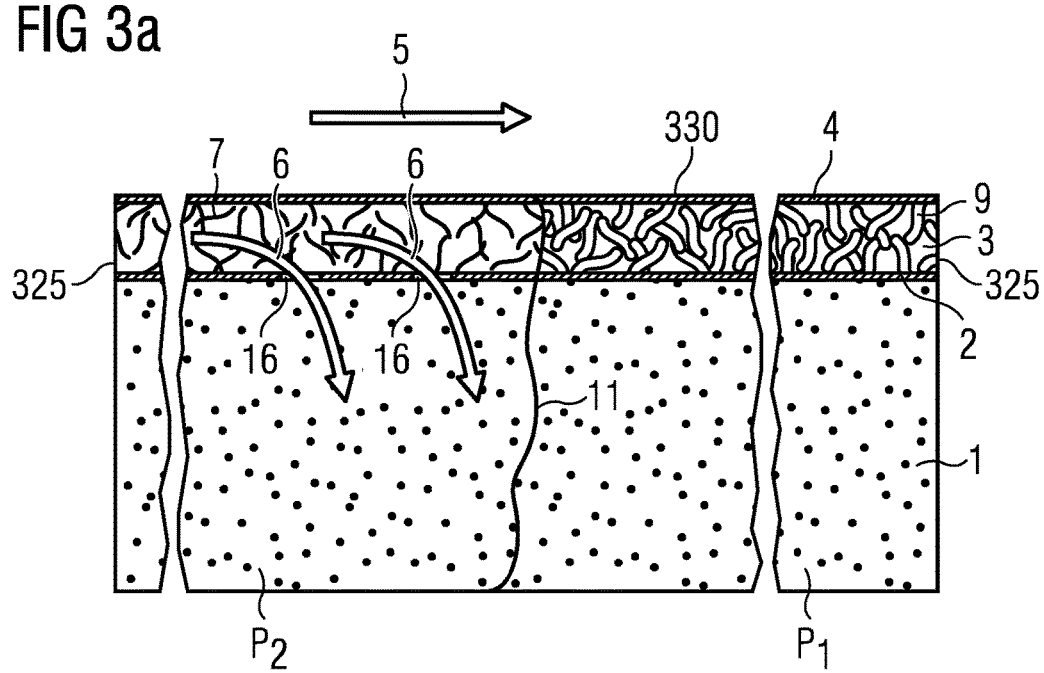

FIG. 3a illustrates a cavity 330 with a first opening 325 connectable to a resin inlet of an VARTM apparatus and a second opening 315 connectable to a vacuum pump of a VARTM apparatus.

Figure 4:
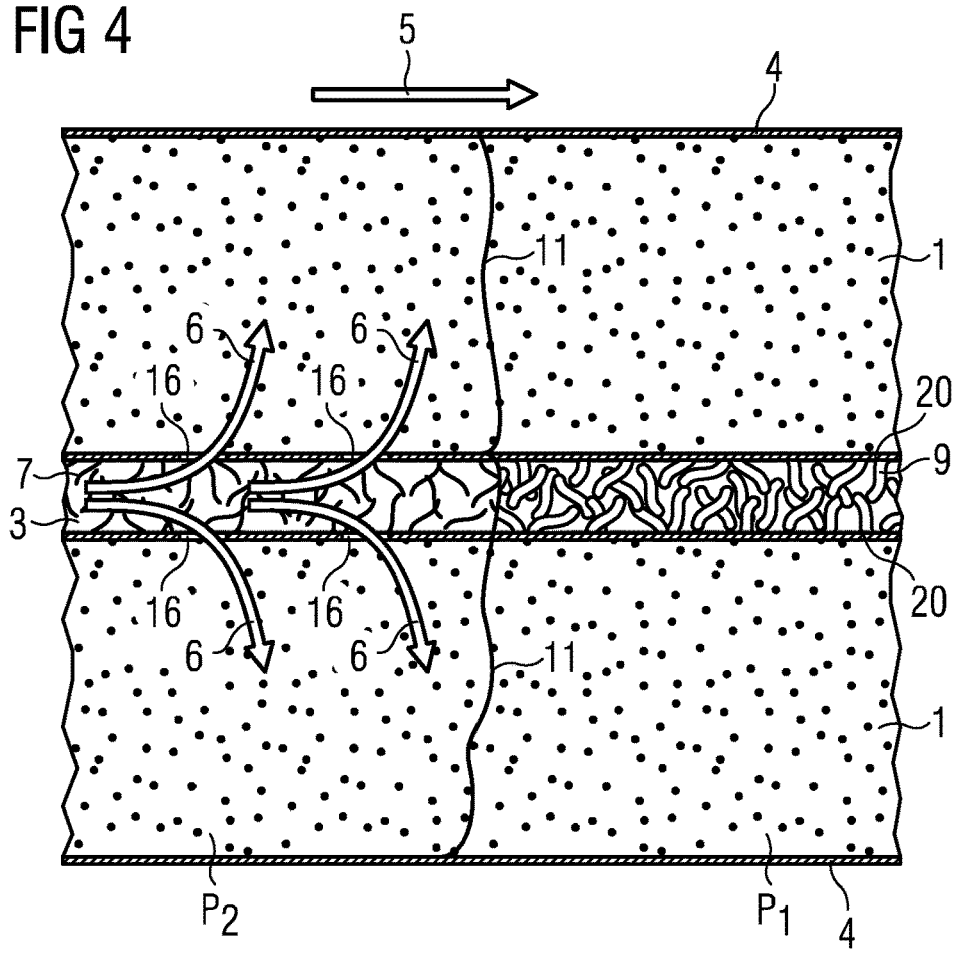
FIG. 4 shows a cross section of a laminate part in a VARTM process according to a second embodiment.

FIG. 4 shows a cross section of a laminate part in a VARTM process according to a second embodiment. The laminate consists of a first vacuum film 4, a first fibre stack 1, a first intermediate layer 20, a resin flow enhancing member 3, a second intermediate layer 20, a second fibre stack 1, and a second vacuum film 4.

The resin flow enhancing member 3 according to the embodiment is similar to the member 3 used in the first embodiment, with the exception that the resin infiltrates in the first and in the second fibre stacks 1 arranged adjacent to the resin flow enhancing member 3 as shown by the arrows 6.

The resin flow enhancing member 3 comprises gas-filled hollow fibres 7, 9 which are expandable by applying vacuum such that they fill more space in the member 3 under the pressure condition $P_1$ (reduced static pressure or vacuum) than under the pressure condition $P_2$ (about atmospheric pressure). Thereby, the movement of the resin flow front 11 can be slowed down and the resin intrusion 6 into the fibre stacks 1 perpendicular to the resin flow direction 5 in the resin flow enhancing member 3 can be increased.

Figure 5:
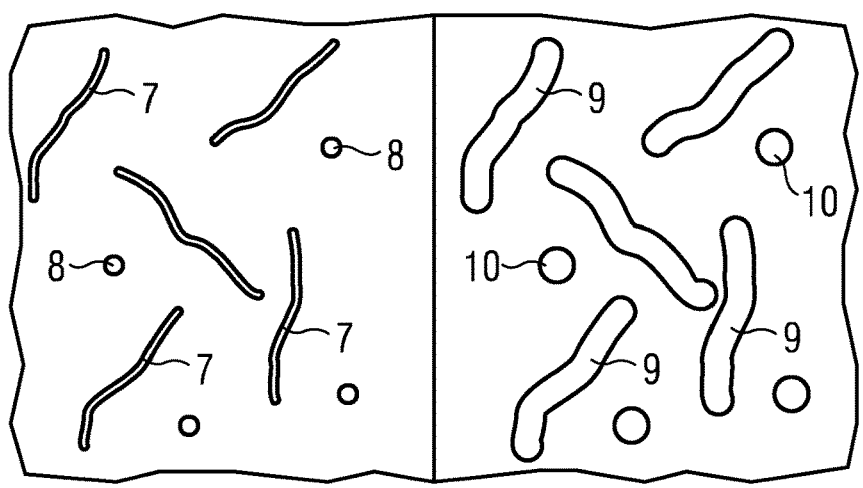
FIG. 5 shows a schematic view of vacuum expandable filler elements for use in a process according to an embodiment in two different pressure environments.

FIG. 5 shows a schematic view of vacuum expandable filler elements in two different pressure environments. On the left hand side, the fibres 7 or spheres 8 are under atmospheric pressure, while the fibres 9 or spheres 10 are under reduced pressure (vacuum) at the right hand side of the figure. This figure shows schematically the effect of the change of the shape of the filler elements 7, 9, 8, 10. More particularly, the cross-sectional area which is free for a resin flow is significantly lower at the side where vacuum is applied than at the left hand side, showing the situation with atmospheric pressure.

Figure 6:
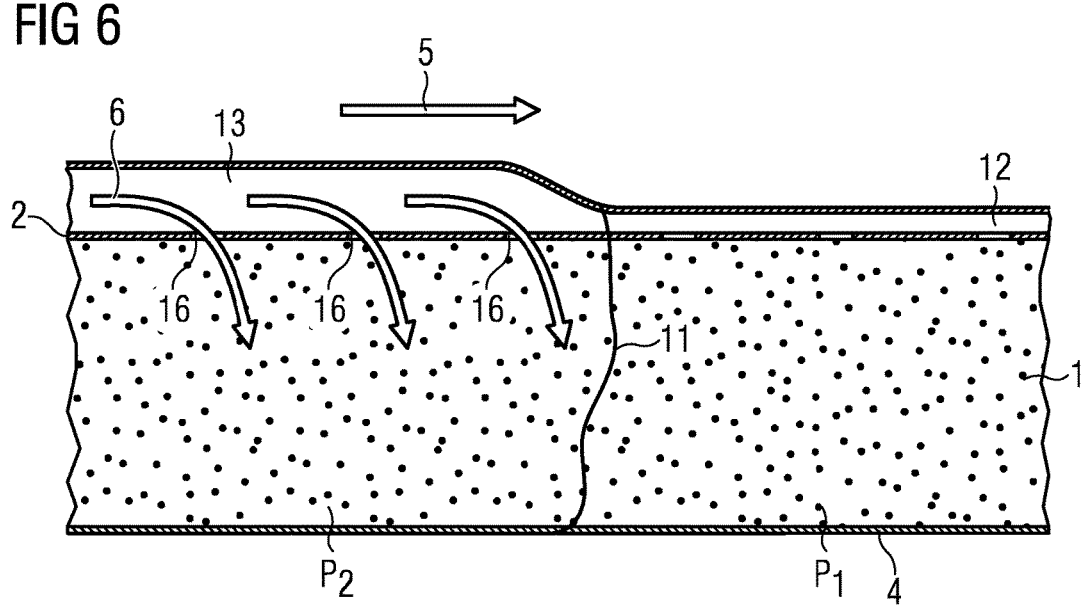
FIG. 6 shows a cross section of a laminate part in a VARTM process according to a third embodiment.
Figure 7:
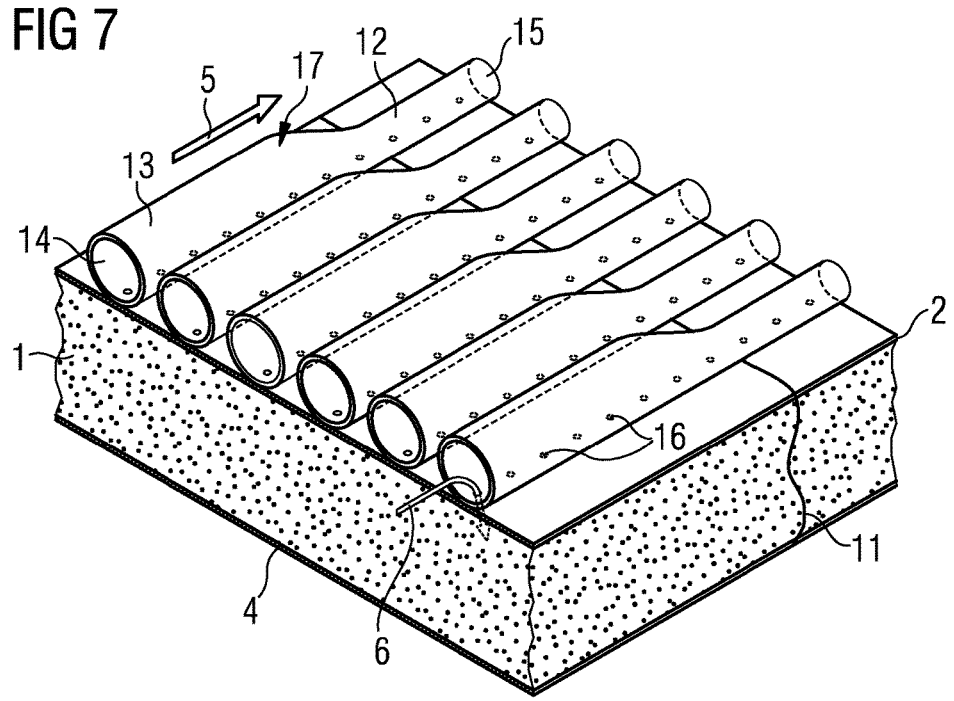
FIG. 7 shows a perspective view onto the laminate part shown in FIG. 6.

FIG. 6 shows a cross section of a laminate part in a VARTM process according to a third embodiment and FIG. 7 shows a perspective view onto this laminate part.

This embodiment is similar to the first embodiment shown in FIG. 3. Therefore, with regard to the general constitution of the laminate we generally refer to the description of this figure.

The resin flow enhancing member (also considered a resin flow adjusting arrangement) is comprised of a plurality of parallel tubes 17 having a flexible tube wall. Flexible means in this regard, that the tube diameter 14 at the side of high static pressure is bigger than the tube diameter 15 at the side of low static pressure (vacuum). This behaviour is achieved by using an elastomeric polymer material, which is automatically stretched by means of the static pressure the resin provides from inside the tube. The tube part 12 in front of the resin flow front 11 with regard to the resin flow front movement 5 is, by means of the low static pressure inside the tube, smaller than the tube part 13 behind the resin flow front 11. Therefore, the resin flow is similarly regulated, i.e. slowed down in the direction parallel to the tube (identified with arrow 5), but at the same time, the resin intrusion (resin flow identified by arrow 6) into the fibre stack is increased. The technical principle underlying this embodiment is the same as in the first and second embodiment because the free flow cross section in the resin flow enhancing member is changed within the flow direction 5 of the resin flow.

Although the disclosure provides specific embodiments and variations thereon, it will be understood that numerous additional modifications and variations could be made thereto without departing from the scope. While the embodiments has been described with reference to wind turbine blades, other plastic composite materials such as wings or rotors for airplanes, helicopters, coolers, or car parts as well as parts in the automotive industry or similar devices may also be prepared with the method. The resin flow enhancing member can be generally used in the field of vacuum assisted resin transfer moulding process, e.g. in vacuum assisted resin intrusion processes etc. for manufacturing composite materials which can be widely used in similar technical fields. For the sake of clarity, it is to be understood that the use of "a" or "an" throughout this application does not exclude a plurality, and "comprising" does not exclude other steps or elements. A "member", "device" or "element" can comprise a number of separate members, devices or elements, unless otherwise stated.

The invention claimed is:

1. A fibre reinforced plastic composite material, comprising:
 a vacuum assisted resin transfer moulded fibre reinforced plastic laminate prepared by use of a resin flow enhancing member, the resin flow enhancing member comprising:
  a cavity with a first opening connectable to a resin inlet of an VARTM apparatus and a second opening connectable to a vacuum pump of a VARTM apparatus, and a resin flow adjusting arrangement for changing a resin flow cross section in a resin flow direction from the first opening to the second opening in the cavity by applying vacuum to the second opening, wherein the resin flow adjusting arrangement comprises a plurality of vacuum expandable filler elements comprising gas-filled closed cell cavities and flexible walls.

2. The fibre reinforced plastic composite material according to claim 1, having a shape of a wind turbine blade.

3. The fibre reinforced plastic composite material according to claim 1, wherein the plurality of vacuum expandable filler elements comprises elastomeric plastic materials.

4. The fibre reinforced plastic composite material according to claim 3, wherein the plurality of vacuum expandable filler elements comprises thermoplastic fibres mixed with the elastomeric plastic materials.

5. A vacuum assisted resin transfer moulding process for injecting resin from a resin flow enhancing member into a fibre stack, wherein the resin flow enhancing member comprises a cavity with a first opening connectable to a resin inlet of a VARTM apparatus and a second opening connectable to a vacuum pump of a VARTM apparatus, a resin penetrable wall or openings for penetration of resin into the fibre stack, and a resin flow adjusting arrangement, comprising changing a resin flow cross section of the cavity in a resin flow direction by applying vacuum at the second opening, wherein the resin flow adjusting arrangement comprises a plurality of vacuum expandable filler elements comprising gas-filled closed cell cavities and flexible walls.

6. The process of claim 5, wherein the resin flow front moves from a resin intrusion side to a vacuum side of the resin flow enhancing member during the process and the cross section area of the cavity is changed at the resin flow front.

7. The process of claim 5, wherein the resin from the resin flow enhancing member is injected into a first fibre stack and a second fibre stack, wherein the first fibre stack and the second fibre stack are both adjacent to the resin flow enhancing member.

8. The process of claim 5, wherein the plurality of vacuum expandable filler elements comprises elastomeric plastic materials.

9. The process of claim 8, wherein the plurality of vacuum expandable filler elements comprises thermoplastic fibres mixed with the elastomeric plastic materials.

\* \* \* \* \*